E. O'MARA.
VACUUM PUMP.
APPLICATION FILED DEC. 6, 1915.
1,245,612.  Patented Nov. 6, 1917.
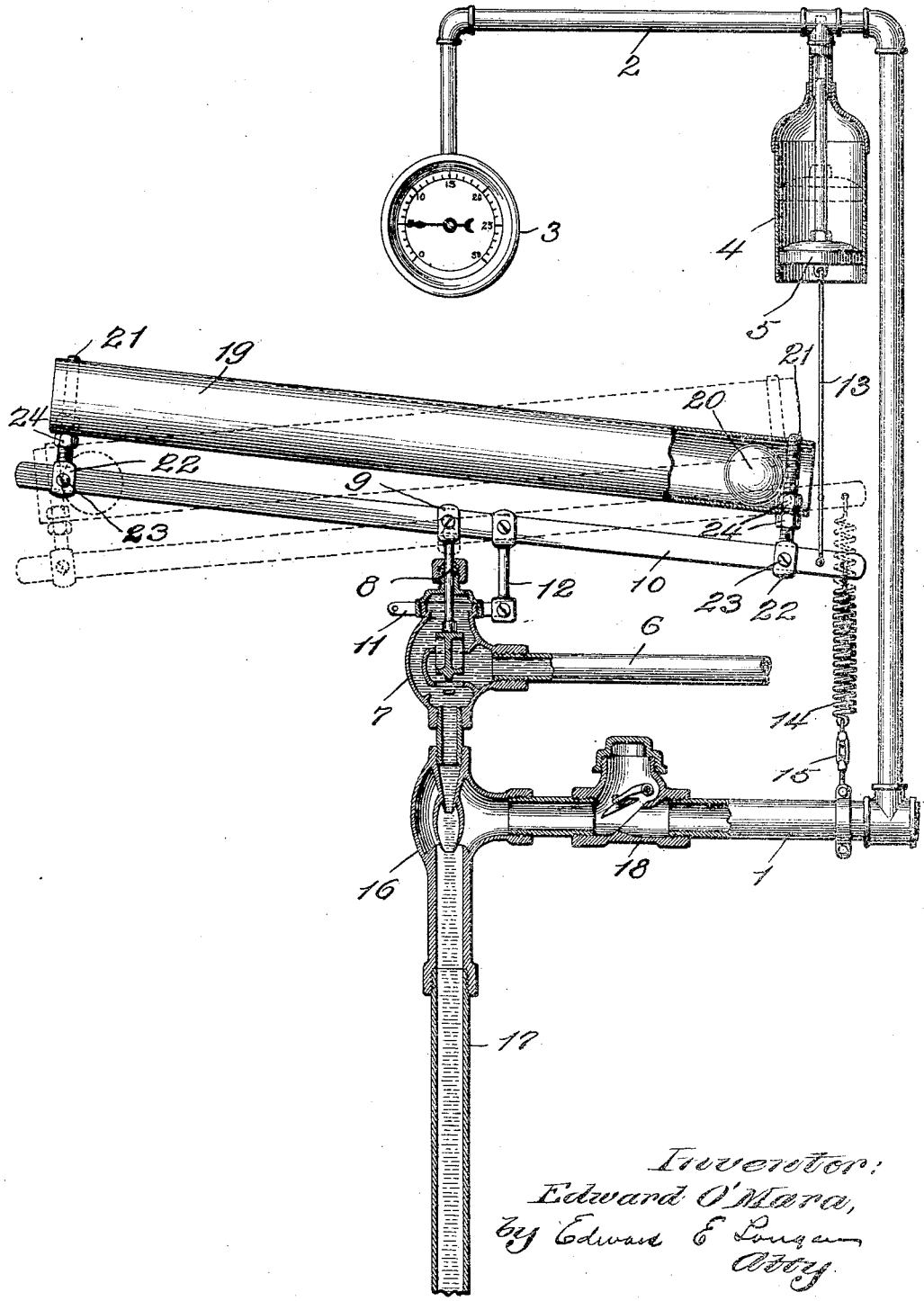

UNITED STATES PATENT OFFICE.

EDWARD O'MARA, OF ST. LOUIS, MISSOURI.

VACUUM-PUMP.

1,245,612.  Specification of Letters Patent.  Patented Nov. 6, 1917.

Application filed December 6, 1915. Serial No. 65,261.

*To all whom it may concern:*

Be it known that I, EDWARD O'MARA, a citizen of the United States, and resident of St. Louis, Missouri, have invented certain new and useful Improvements in Vacuum-Pumps, of which the following is a specification containing a full, clear, and exact description, reference being had to the accompanying drawings, forming a part hereof.

My invention relates to improvements in vacuum pumps wherein a constant uniform vacuum is maintained by the action of a stream of fluid flowing from a source under constant pressure such for instance as a pipe leading from a pumping station, and it is my object to construct an apparatus especially designed for connection with a heating system to create and maintain a constant uniform vacuum for connection with the venting pipes of the heating system, and for connection with a pipe including an ejector and a valve leading from a source of water supply under constant pressure.

With the above object in view my invention consists in certain novel details of construction and arrangement of parts hereinafter fully, clearly and concisely described, specifically pointed out in my claims and illustrated by the accompanying drawing, which is made a part of this specification and in which drawing the figure shows an elevation partly in section, of an apparatus embodying my improvements.

Referring by numerals to the accompanying drawing, 1 designates a pipe which for the purpose of this specification will be termed the vacuum line or the vent pipe of a steam heating system.

The numeral 2 designates a branch of the vacuum line having connected therewith a vacuum gage 3, and to which I secure a cylinder 4. Mounted in the cylinder 4 is a piston 5 whose movement is effected by the variations in the vacuum for the control of the flow of a fluid for the creation and maintenance of the vacuum.

The numeral 6 designates a pipe or other conveyer leading from a source of water under pressure not shown, to which pipe 6 is connected a balanced valve 7, the stem 8 of which valve projects upwardly through the bonnet and stuffing box as is common, and has at its upper end an eye 9 through which there is extended a tilting beam 10 for the operation of the valve 7.

Surrounding the base of the bonnet of the valve 7 there is a collar 11 and arising from this collar is a post 12 constituting a fulcrum for the beam 10. Connecting the beam 10 with the piston 5 is a rod 13 arranged to move said beam when said piston is moved or effected by differences in vacuum.

Connected with the beam 10 at a point adjacent the rod 13 is a contractile coil spring 14 provided with a tension adjusting device 15 such as the turn buckle shown, whereby to regulate the spring as required for different desired vacuums.

The numeral 16 designates an ejector which is of the T or three way type, which connects the balanced valve 7 and the vacuum line 1 with a waste pipe 17.

In the vacuum line 1 adjacent the ejector there is a check valve 18.

Carried by the beam 10 and for movement therewith is a tube 19 in which there is mounted for free movement therein a ball 20. By preference I employ a tube open at both ends through which there is formed adjacent each end, diametrically opposite perforations through which there is extended a threaded bolt 21 each having at its lowermost end an eye 22 through which the beam 10 is extended, and a set screw 23 for holding the bolt against movement lengthwise of the beam.

As a means for varying angular relationship between the tube 19 and tilting beam 10, I provide the nuts 24, arranged on each bolt 21 and on either side of one only of the perforations at each end of the pipe hereinbefore referred to.

These threaded bolts 21 serve a function other than a leveling means between the tube and beam, viz: stops in limiting the movement of the ball 20 to prevent its escaping from the tube.

In the drawing the balanced valve 7 is shown in an open position with the water flowing therethrough from the pipe 6, the check valve 18 in an open position showing that the ejector is drawing upon the vacuum line, the spring 14 holding the beam 10 tilted at an angle and with the piston 5 held by the rod 13 in its lowermost position indicating that the water is flowing, the ejector is operating to draw upon the vacuum line and that the apparatus as a whole is in working condition. This condition is altered by the vacuum and at any pre-determined degree which when established draws upwardly on the piston 5 and through the medium of the rod 13 moves the tube and beam to the position shown in dotted lines against the tension of the spring 14.

In view of the fact that only a low vacuum is desired or necessary for the venting of a heating system, I find it to advantage to employ a means such as the ball 20 and tube 19 for the quick and full operation of the balanced valve 7.

I have found it to advantage to employ as the vacuum creating means, water from a constant source under pressure in that this means is ready to operate at all times regardless of whether or not there is steam in the heating system.

Having thus described my invention, what I claim as new therein and desire to secure by Letters-Patent of the United States, therefor is:

1. An apparatus of the class described, comprising a vacuum pipe, a check valve mounted therein, a pipe for water under pressure, a cut-off valve in said last mentioned pipe, a waste pipe, a water ejector positioned adjacent the pipe for the water under pressure and discharging into the waste pipe, a tilting beam fulcrumed over said cut-off valve and pivotally connected therewith, a tube adjustably mounted on said tilting beam, a weight located in said tube arranged to move by gravity from end to end of said tube, a piston and cylinder connected with said vacuum pipe, a pivotal connection between said piston and tilting beam and a variable tension device connected with said tilting beam and vacuum pipe in opposition to said cylinder and piston.

2. An apparatus of the class described, comprising a vacuum pipe, a check valve located therein, a pipe for water under pressure, a cut-off valve mounted in said last mentioned pipe, a waste pipe, a water ejector positioned adjacent the pipe for the water under pressure and discharging into said waste pipe, a tilting beam fulcrumed over said cut-off valve and pivotally connected therewith, a tube mounted on said tilting beam, a weight located in said tube, means for independently adjusting the ends of said tube, a piston and cylinder connected with said vacuum pipe, a pivotal connection between said piston and tilting beam, and a variable tension device connected with said tilting beam and vacuum pipe in opposition to said cylinder and piston.

3. An apparatus of the class described comprising a vacuum pipe, a check valve mounted therein, a pipe for water under pressure, a cut-off valve mounted in said last mentioned pipe, a waste pipe, a water ejector positioned adjacent to the pipe for the water under pressure and discharging into the waste pipe, a tilting beam fulcrumed over said cut-off valve and pivotally connected therewith, a tube having open ends mounted on said tilting beam, a weight located in said tube, means for independently adjusting the ends of said tube which means answer as a retaining means for the weight within the tube, a piston and cylinder connected with said vacuum pipe, a pivotal connection between said piston and tilting beam and a variable tension device connected with said tilting beam in opposition to said cylinder and piston.

In testimony whereof, I have signed my name to this specification, in presence of two subscribing witnesses.

EDWARD O'MARA.

Witnesses:
R. C. ORWIG,
A. S. KIBURTZ.